United States Patent [19]

Rickards

[11] 4,019,377
[45] Apr. 26, 1977

[54] ELASTOMER STRAIN GAGE

[75] Inventor: Michael A. Rickards, La Jolla, Calif.

[73] Assignee: Rohr Industries, Inc., Chula Vista, Calif.

[22] Filed: Mar. 29, 1976

[21] Appl. No.: 671,428

[52] U.S. Cl. .......................................... 73/88.5 R
[51] Int. Cl.² .......................................... G01B 7/16
[58] Field of Search ................ 73/88.5 R; 338/3, 6; 33/147 D, 148 D

[56] References Cited

UNITED STATES PATENTS

| | | | |
|---|---|---|---|
| 2,815,424 | 12/1957 | Painter | 73/88.5 R |
| 3,082,621 | 3/1963 | Soderholm | 73/88.5 R |
| 3,323,092 | 5/1967 | Balazs et al. | 73/88.5 R |
| 3,433,060 | 3/1969 | Ives et al. | 73/88.5 R |

Primary Examiner—James J. Gill
Assistant Examiner—Anthony V. Ciarlante

Attorney, Agent, or Firm—Patrick J. Schlesinger; Frank D. Gilliam

[57] ABSTRACT

A temperature compensating strain gage for measuring elongation of parent elastomeric material. The strain gage comprises an elongated elastomeric strap having the same or similar temperature characteristics as the parent elastomeric material, a clamp secured to the parent material for securing one end of the strap, a transducer, a pair of side by side spaced apart transducer mounts, one of the mounts is attached to the free end of the strap and the other is attached to the parent material, a heat transferring medium is positioned between the parent material and the strap intermediate the ends and a strain gage element is mounted on the transducer.

6 Claims, 4 Drawing Figures

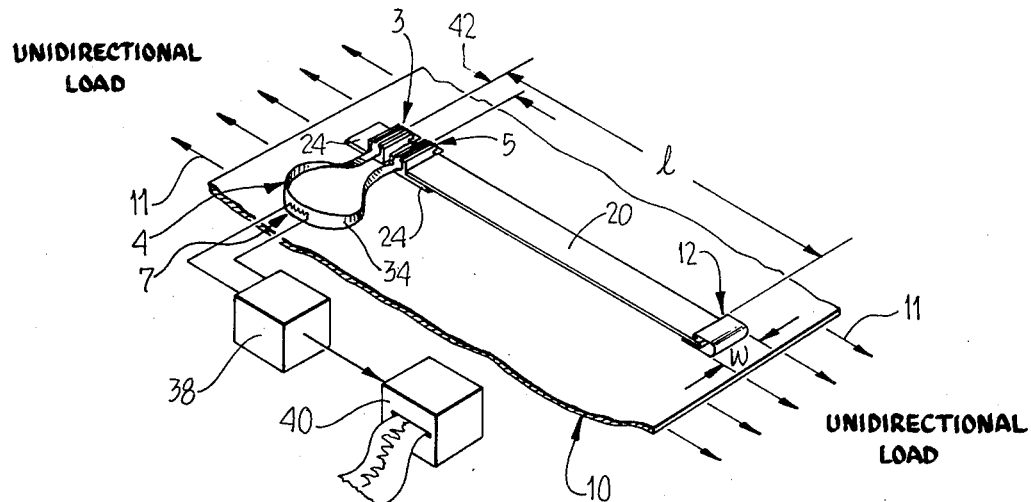
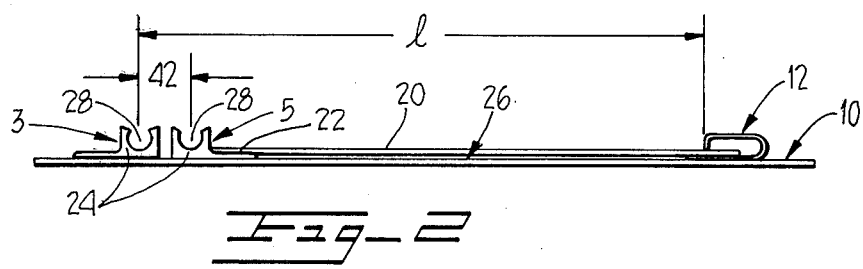
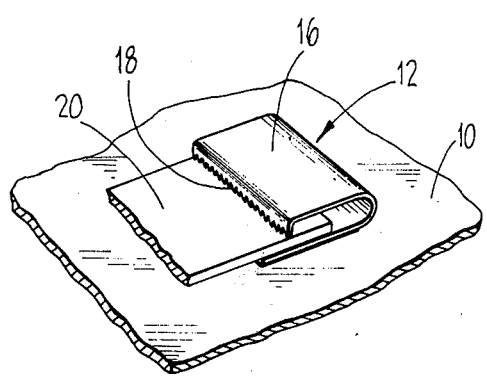
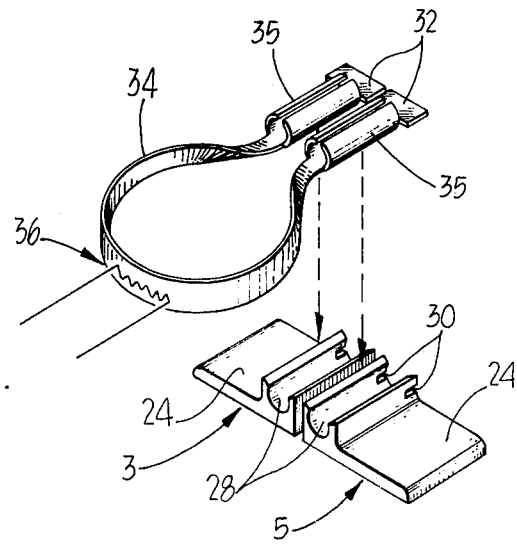

ELASTOMER STRAIN GAGE

BACKGROUND OF THE INVENTION

The present invention relates to strain gage measuring devices and more specifically to a temperature compensated strain gage for measuring elongations of elastomeric materials.

Bonded wire resistance strain gages are commonly used to measure stress and strain produced in material specimens under load. Such a device is taught by U.S. Pat. Nos. 2,815,424 and 3,433,060. Both patents teach transmitting strain to a point remote from the specimen under test by means of a mechanical transducer formed as an arcurately shaped strip of resilient material. The first mentioned patent teaches attachment by means of sharp points at each end of the transducers for penetrating the test specimen. The last mentioned patent teaches permanently installing the transducers to the material to be monitored. These features create a disadvantage in that penetration causes damage to the specimen under test, as well as becoming disconnected from the specimen when stress and strain is encountered. Permanent installation of the strain gage is costly as the elements can not be reused. It is well known that source of measurement error exists with changes of temperature if the specimen is encountered. This error is defined as zero error. As the system zero reference changes, false reading occurs indicating non-existent dynamic stress. U.S. Pat. Nos. 3,290,928 and 3,303,693 take this factor into account by compensating for this apparent strain. Both of the methods taught require considerable expense in both fabrication and installation.

Clearly reuseable transducers and strain gages and an inexpensive method for continually compensating for temperature changes would be readily acceptable by industry.

SUMMARY OF THE INVENTION

The present invention obtains the various benefits of the prior art devices and includes a reuse capability, as well as, compensating for zero error at a reduction of economic cost and complexity. Generally stated, the apparatus includes an elongated strap fabricated from the same or a similar material having the same temperature characteristics as the specimen to be monitored for stress and strain. The strap is attached to the surface of the test specimen at one end either by attachment directly to the specimen or to a resilient clamp attached to the specimen. The free end of the strap has a first transducer mounting means attached thereto. A second and similar mounting means is positioned adjacent to the first mounting means and is attached to the test specimen. A heat transferring medium is positioned between the specimen and the strap intermediate the strap ends so as to insure the strap and specimen have the same temperature. A transducer with a strain gage attached is removably mounted between the mounting means. When the temperature of the strap and specimen change each expand or contract in a like degree. The specimen, for example, with a rise in temperature, expands moving the mounting means away from each other; however, at the same time the strap expands a like amount toward its free end, the transducer mounting end, moving the mounting means on the strap toward the specimen attached mounting means the same distance in a a direction opposite to the specimen. It should be readily understood that the equal but opposite movement of the strap maintains a constant zero reference between the mounts regardless of the thermal movement of the specimen.

It is the object and purpose of this invention to get repeated use from any given strain gage, transducer device, get more accurate measurements by monitoring a large sample of the test specimen due to the length of the strap and economically and simply, for all practical purposes eliminate the thermal zero shift.

The above and other features of the invention will be readily apparent as the description continues while being read in conjunction with the appended drawings.

The same reference numerals are used throughout the figures to denote the same part or element.

DESCRIPTION OF THE DRAWING

FIG. 1, is a perspective plan view showing the strain gage device and accompanying monitoring equipment.

FIG. 2, is a side view showing of a portion of the FIG. 1.

FIG. 3, is an enlarged perspective showing of a portion of FIG. 1.

FIG. 4, is a detailed perspective showing of the strain gage device of FIG. 1.

DESCRIPTION OF THE PREFERRED EMBODIMENT OF THE INVENTION

Referring now to FIG. 1, a test specimen 10 constructed of elastomeric material is shown with the strain gage if the invention positioned for monitoring the static and dynamic loads encountered by the material 10 when unidirectional force in the direction of arrow 11 is applied thereto.

Referring now that the various figures, a clamp 12 is attached to the test specimen 10 by any convenient means, such as contract cement or other adhesive material suitable to the extent of the loading environment of accelerations experienced by the test specimen 10 at the attachment point. The clamp 12 is formed in the shape of a U from suitable resilient material for the purpose hereinafter described. Referring now specifically to FIG. 3, the upper surface 16 of the clamp 12 at the opening, is formed downward and has teeth or prongs 18 along its surface.

An elongated strap 20 fabricated from the same material as the specimen or similar material having the same temperature characteristics, is shown having one end gripped and held by the teeth 18. The length of the strap is determined by the length of surface area of the specimen required to obtain measurements having a good representation of the material characteristics under load conditions. The longer the strap, within limits, the more accurate the material characteristics of the material monitored. The strap is inserted within the "U" clamp by prying the edges of the opening of the clamp apart and inserting the strap therein. The resiliency of the clamp grips the strap when the separating force is removed and the strap is then held firmly in position. It should be noted that although this method of attaching the strap is preferable for allowing re-use of the strap for additional future measurements, the strap may, for some applications, be cemented directly to the specimen in the same manner as the clamp. The free end 22 of the strap has a transducer mount 24 attached to its surface adjacent the specimen. Between the strap 20 and the specimen 10 there is positioned a layer of good heat transfer material to insure that changes in temperature of the specimen is transferred to the strap. The heat transfer material may be, for example, a plastic potting compound exhibiting a high thermal conductivity and some degree of adhesiveness sufficient to adhere to the elongated strap 20 and specimen 10 but not effect a solid bond, (retain plasticity). The basic function of the thermal material 26 is to ensure that a one-to-one thermal relationship between the strap and the specimen is constantly maintained. The thermal transfer material 26 has the further purpose of removing wrinkles from the elongated strap to insure maximum measurement accuracy by preventing inadvertent slack between the strap and material 10.

A second transducer mount 24 is attached to the specimen in the same manner as clamp 12. The second transducer mount 24 is positioned adjacent to and spaced from the first strap attached mount 24. The transducer mounts have a semicircular channel 28 with their openings facing away from the upper surface of material 10 and run transverse to the longitudinal direction of the strap, see FIGS. 3 and 4. Both mounts 24 have a slot 30 in one of their adjacent outer edge surfaces, see FIG. 4, for receiving a flange 32 at the tips of mounting prongs 35 of transducer 34, hereinafter described.

The transducer mount 34 is formed from an accurately bent strip of resilient material with a prong 35 attached to each free end. The free ends of the prongs 35 are aligned in the direction of the strain force and one is received in each mounting means 24. A conventional strain gage, the preferred embodiment being of a resistance type, is cemented to the transducer intermediate and preferably midway between its prongs or free ends 35. At the end of each prong 35 is a stop-lock 32 provided for mating with their respective slot 30 for securing the transducer in place while the test material 10 is in continuous stress force while under test.

OPERATION OF THE PREFERRED EMBODIMENT

Referring now to FIG. 1, the transducer mounting means and the strap are mounted to the specimen as hereinbefore explained. The strain gage 36 is connected to a resistance to voltage converter 38 which has a signal voltage output connected to the input of a strip chart recorder 40 which produces a recording indicative of stress in the direction of arrow 11. As the temperature of the test specimen 10 changes, the distance 42 between the mounts 24, for example when the temperature increases, gets larger as the specimen increases in length. At almost the same time the test specimen 10 increases in length, in the direction of arrows 11, the strap 20 also elongates in the same amount thereby keeping length 42 constant. In most applications the temperature change of the specimen and strap are so gradual that the gap length 42 between the mounts 24 effectively never changes.

Many changes may be made in details of the instant invention, in the method and materials of fabrication, in the configuration and assembling of the constituent elements, without departing from the spirit and scope of the appended claims, which changes are intended to be embraced therewithin.

Having thus described the invention, what is claimed as new and useful and desired to be secured by United States Letters Patent is:

1. A temperature compensating strain gage apparatus for measuring surface elongations of an elastomeric material comprising:
   an elongated strap of said elastomeric material;
   means for attaching one end of said strap to the surface of said elastomeric material;
   a first and second strain gage holding means, said first holding means is fixedly attached to the end of said strap remote from said means for attaching and said second holding means fixedly attached to said surface adjacent and spaced from said first holding means;
   a strain gage removably secured to said first and second holding means for measuring relative movement therebetween; and
   a heat transferring medium positioned between said surface and said strap intermediate its ends.

2. The invention as defined in claim 1, wherein said means for attaching one end of said strap is adhesive.

3. The invention as defined in claim 1, wherein said means for attaching one end of said strap is a clamp attached to said surface.

4. The invention as defined in claim 1, wherein said strain gage is attached to an open stress ring of uniform diameter, each side of the opening of said stress ring is attached to one of said first and second strain gage holding means.

5. The invention as defined in claim 4, wherein each side of said opening is provided with a semi-circular prong and each of said first and second strain gage holding means have an opening for receiving said prongs.

6. The invention as defined in claim 5, wherein each of said first and second strain gage holding means have slots in adjacent end surfaces and said prongs each have elongated stop locks in each end thereof, said stop locks engage said slots for securing said stress ring prongs to said strain gage holding means.

* * * * *